(12) United States Patent
Sugiyama et al.

(10) Patent No.: US 7,312,854 B2
(45) Date of Patent: Dec. 25, 2007

(54) POSITION SENSITIVE PHOTOELECTRIC SENSOR AND METHOD OF SETTING REFERENCE DISTANCE IN THE SAME

(75) Inventors: Kazutoshi Sugiyama, Osaka (JP); Takeshi Oue, Osaka (JP)

(73) Assignee: Keyence Corporation, Osaka (JP)

( * ) Notice: Subject to any disclaimer, the term of this patent is extended or adjusted under 35 U.S.C. 154(b) by 129 days.

(21) Appl. No.: 11/355,572

(22) Filed: Feb. 16, 2006

(65) Prior Publication Data

US 2006/0187441 A1    Aug. 24, 2006

(30) Foreign Application Priority Data

Feb. 18, 2005    (JP)    ............. P 2005-041435

(51) Int. Cl.
*G01C 3/08* (2006.01)
*G01B 11/14* (2006.01)
(52) U.S. Cl. ............... 356/3.01; 356/3.05; 356/4.07; 356/623
(58) Field of Classification Search ............... 356/3.01, 356/3.05, 4.01, 4.07, 5.01, 5.15, 614, 623
See application file for complete search history.

(56) References Cited

U.S. PATENT DOCUMENTS

| | | | | |
|---|---|---|---|---|
| 5,227,828 | A | * | 7/1993 | Kirigaya ............... 396/103 |
| 5,446,281 | A | * | 8/1995 | Taranowski et al. ........ 250/221 |
| 5,760,390 | A | * | 6/1998 | Vezzalini et al. ........... 250/221 |
| 6,118,943 | A | * | 9/2000 | Ohsawa ................. 396/51 |
| 6,240,252 | B1 | * | 5/2001 | Yamaguchi et al. .......... 396/61 |
| 2004/0217899 | A1 | * | 11/2004 | Kikuchi ................... 342/75 |
| 2005/0275825 | A1 | * | 12/2005 | Ohtomo et al. ............ 356/4.04 |

FOREIGN PATENT DOCUMENTS

JP    06-168652    6/1994

* cited by examiner

*Primary Examiner*—Isam Alsomiri
(74) *Attorney, Agent, or Firm*—Kilyk & Bowersox, P.L.L.C.

(57) ABSTRACT

In a position sensitive photoelectric sensor that calculates a distance to a target based on a triangular range finding using a light and outputs a result compared with a reference distance, first the reference distance Dref is set roughly by using a light receiving portion adjusting mechanism that changes an angle of a light receiving portion including a reception lens and a light receiving device. Then, the change adjustment of the reference distance is performed by teaching. In addition, the user performs a fine adjustment of the reference distance by a manual adjustment using an increase/decrease key if necessary.

17 Claims, 10 Drawing Sheets

POSITION SENSITIVE PHOTOELECTRIC SENSOR AND METHOD OF SETTING REFERENCE DISTANCE IN THE SAME

The present application claims foreign priority based on Japanese Patent Application No. 2005-041435, filed Feb. 18, 2005, the content of which is incorporated herein by reference.

BACKGROUND OF THE INVENTION

1. Technical Field

The present invention relates to a position sensitive photoelectric sensor for sensing a distance to a target by a triangular range finding using a light, and a method of changing a reference distance set in the same.

2. Related Art

Figure 1:
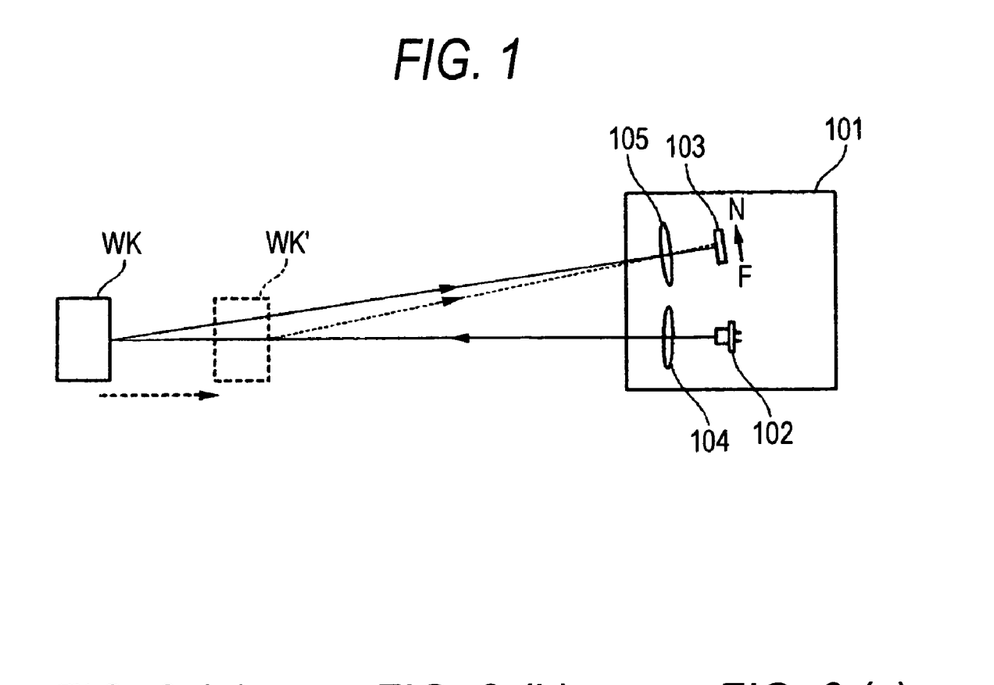
FIG. 1 is a view showing an operational principle of a position sensitive photoelectric sensor.

This type photoelectric sensor is called a position sensor or a displacement sensor in some cases, and used to measure a distance to a target (referred to as a "work" hereinafter) based on a triangular range finding using a light. As shown in FIG. 1, a light emitting device 102 and a light receiving device 103 are arrange at a predetermined interval in a sensor head 101. A light projected from the light emitting device 102 is passed through a projection lens 104 and then projected onto a work WK. Then, a light reflected from the work WK is passed through a reception lens 105 and incident on the light receiving device 103. As the light receiving device 103, PSD (position sensitive semiconductor device) or CCD (solid-state image sensor), which has a photosensitive surface in a predetermined range and is able to sense a spot position of the incident light on the photosensitive surface or a center-of-gravity position of a light quantity distribution, is employed.

In FIG. 1, when a position of the work WK comes closer to the sensor head 101 as shown by a broken line, the reflected light incident on the light receiving device 103 is changed as shown by a broken line. Therefore, the spot position of the received light on the photosensitive surface of the light receiving device 103 or the center-of-gravity position of the light quantity distribution is moved as indicated with an arrow. When the work WK is moved in the direction to go away from the sensor head 101, the spot position of the received light on the photosensitive surface of the light receiving device 103 or the center-of-gravity position of the light quantity distribution is moved in the opposite direction to that indicated with an arrow. Accordingly, a distance to the work WK or its displacement can be measured by sensing the spot position of the received light on the photosensitive surface of the light receiving device 103 or the center-of-gravity position of the light quantity distribution.

Normally such photoelectric sensor has functions of measuring a distance to the work WK and displaying it, and also displaying a compared result between a measured result and a reference distance (threshold value) as a binary signal and outputting it to the external device. Also, there is the photoelectric sensor that is specialized to have only a function of outputting the binary signal as the compared result between the distance to the work and the reference distance. Sometimes this sensor is called particularly a distance settable photoelectric switch. In such distance settable photoelectric switch, a split PD (photodiode) that is more inexpensive than above PSD or CCD can be used as the light receiving device.

Figure 2:
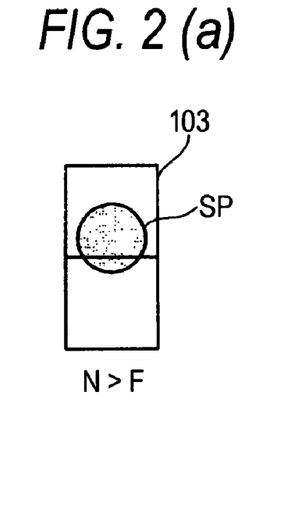
FIGS. 2(a) to 2(c) are views showing an operational principle of a split PD as a light receiving device.

As shown in FIG. 2, the split PD 103 as the light receiving device has the photosensitive surface divided into two parts, and individual received light quantity signals can be detected from respective split photosensitive surfaces. One split photosensitive surface is called an N-side (Near side) photosensitive surface, and the other split photosensitive surface is called an F-side (Far side) photosensitive surface. As shown in FIG. 2(b), when a received light spot SP is positioned on the boundary between the N-side photosensitive surface and the F-side photosensitive surface, equal received light quantity signals can be obtained from both split photosensitive surfaces. Also, as shown in FIG. 2(a), when the received light spot SP is shifted to the N-side photosensitive surface, a quantity of received light obtained from the N-side photosensitive surface becomes larger than a quantity of received light obtained from the F-side photosensitive surface (N>F). Conversely, as shown in FIG. 2(c), when the received light spot SP is shifted to the F side photosensitive surface, a quantity of received light obtained from the F-side photosensitive surface becomes larger than a quantity of received light obtained from the N-side photosensitive surface (N<F). Accordingly, if a situation shown in FIG. 2(b) is supposed as a reference distance, the binary signal indicating whether a distance to the work WK is near to the reference distance or far from the reference distance can be output based on that a difference in quantities of received lights obtained from the N-side photosensitive surface and the F-side photosensitive surface is positive or negative.

As can be understood from FIG. 1, in the above position sensitive photoelectric sensor, a measurable distance range is decided based on a size of the photosensitive surface of the light receiving device and constants of an optical system (an interval between the light emitting device 102 and the light receiving device 103, a magnification of the reception lens, and the like). When the position of the work is out of the measurable distance range, the received light spot of the reflected light is also out of the photosensitive surface of the light receiving device and thus the reflected light cannot be measured. When a magnification of the reception lens is increased, a wide distance range can be covered with the small light receiving device (photosensitive surface), but a resolving power is degraded. Therefore, the short-distance position sensitive photoelectric sensor and the long-distance position sensitive photoelectric sensor are provided in the related art.

Also, in the case of the distance settable photoelectric switch, since the reference distance applied to output the binary signal is decided based on a positional relationship between the light emitting device and the light receiving device, an angle, and the like, it is difficult for the user to change the reference distance arbitrarily. For example, in JP-A-6-168652 (hereinafter referred as Patent Literature 1), the distance settable photoelectric switch the reference distance of which the user can change by providing a mechanism, which changes/adjusts an angle of a light receiving axis, and the like, to the sensor head has been proposed.

However, in the distance settable photoelectric switch set forth in Patent Literature 1, since the reference distance is set only by the adjusting mechanism of the optical system, it is difficult to set the optimum reference distance. In particular, the setting varies widely among the workers (users). Also, in the position sensitive photoelectric sensor of the type that the distance to the work is measured, as described above, it is difficult to cover the wide measured distance range by one sensor.

SUMMARY OF THE INVENTION

The present invention has been made in view of the above problems, and aims at making a setting and a change of a reference distance, which is compared with a distance to a work, easy and proper by using together a setting in an adjusting mechanism of an optical system and a change adjustment based on processes of a signal derived from a light receiving device.

However, the present invention need not achieve the above objects, and other objects not described herein may also be achieved. Further, the invention may achieve no disclosed objects without affecting the scope of the invention.

A configuration of a position sensitive photoelectric sensor of the present invention that includes a light emitting device and a projection lens for projecting a light onto a target, a reception lens and a light receiving device for receiving a reflected light from the target, and a main controlling portion for calculating a distance to the target by processing a signal from the light receiving device to calculate a position of a received light spot on a photosensitive surface or a center-of-gravity position of a received light quantity distribution, which includes an optical adjusting mechanism for changing the position of the received light spot on the photosensitive surface of the light receiving device or the center-of-gravity position of the received light quantity distribution, by adjusting an angle or a position of at least one of the light emitting device, the projection lens, the reception lens, and the light receiving device; wherein the main controlling portion has a function of outputting a binary signal as a compared result between the calculated distance to the target and a reference distance, and a function of performing a change adjustment of the reference distance by software in a situation that an adjustment is made by the optical adjusting mechanism.

In this event, actually a value (digital value) equivalent to the distance may be employed as the distance that the main controlling portion of the position sensitive photoelectric sensor calculates. Therefore, the "distance" mentioned herein means a "distance equivalent parameter".

Also, a method of setting a reference distance in a position sensitive photoelectric sensor of the present invention that includes a light emitting device and a projection lens for projecting a light onto a target, and a reception lens and a light receiving device for receiving a reflected light from the target, calculates a distance to a target based on a triangular range finding using a light, and outputs a binary signal as a compared result between the calculated distance and a reference distance, which includes a first step of changing a position of a received light spot on a photosensitive surface of the light receiving device or a center-of-gravity position of a received light quantity distribution by an optical adjusting mechanism that adjusts an angle or a position of at least one of the light emitting device, the projection lens, the reception lens, and the light receiving device; and a second step of performing a change adjustment of the reference distance by software.

According to the position sensitive photoelectric sensor and the method of setting a reference distance in a position sensitive photoelectric sensor, the setting and the change adjustment of the reference distance are performed in plural stages in such a manner that the reference distance decided based on the arrangement of the optical system is set roughly by the optical adjusting mechanism and then the change adjustment (fine adjustment) of the reference distance is performed by software. Therefore, the user is able to make the setting and the change adjustment of the reference distance easily and properly.

In the preferred configuration, the change adjustment of the reference distance performed by software contains at least any one of an automatic change adjustment performed by teaching and a fine adjustment made by a user's operation of an increase/decrease switch. When the change adjustment contains both adjustments, the setting and the change adjustment of the reference distance can be performed more finely and adequately.

In the preferred configuration of the position sensitive photoelectric sensor of the present invention, a split PD whose photosensitive surface is divided into a first photosensitive surface and a second photosensitive surface to output an individual received light quantity signal from each split photosensitive surface is employed as the light receiving device, and the main controlling portion executes a normalized calculation, in which a difference between a first quantity of received light obtained from the first photosensitive surface and a second quantity of received light obtained from the second photosensitive surface is divided by a sum of both quantities of received light, to get a sensing parameter that changes substantially linearly within a predetermined range in response to the distance, and then performs a change adjustment of the reference distance within the predetermined range. According to this configuration, the position sensitive photoelectric sensor can be constructed by using the split PD that is more inexpensive than PSD or CCD, and also the user can perform the setting and the change adjustment of the reference distance properly.

DETAILED DESCRIPTION OF THE INVENTION

Embodiments of the present invention will be explained with reference to the drawings hereinafter.

Figure 3:
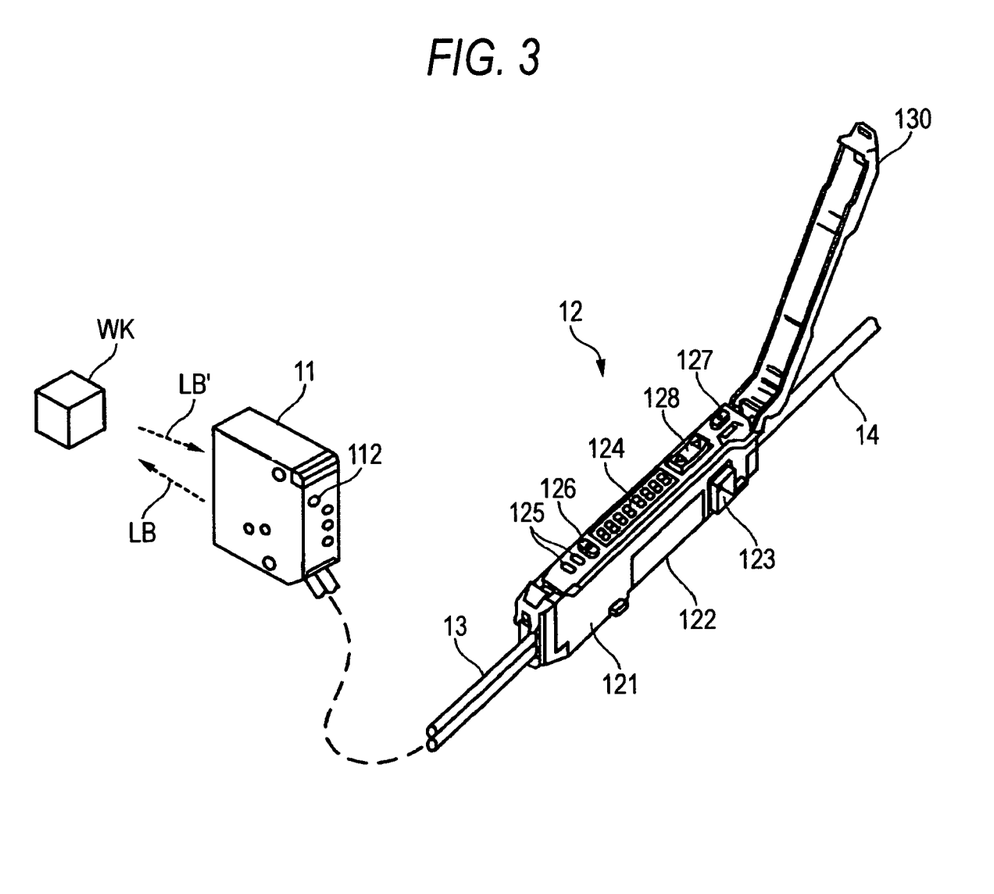
FIG. 3 is a perspective view showing an external appearance of a position sensitive photoelectric sensor according to an exemplary, non-limiting embodiment of the present invention.

FIG. 3 is a perspective view showing an external appearance of a position sensitive photoelectric sensor according to an exemplary, non-limiting embodiment of the present invention. The position sensitive photoelectric sensor of this embodiment shows a so-called amplifier-separated type, and a head portion 11 and an amplifier portion 12 are connected via electric cables 13.

The amplifier portion 12 has a thin rectangular-parallelepiped case 121. The electric cables 13 connected to the head portion 11 are connected to the front end side of the case, and an electric cable 14 connected to an upper control equipment (PLC, or the like) is connected to the rear end side of the case. A structure fitted to the DIN rail (equipment fitting standard rail) is provided to a lower surface 122 of the case 121. A plurality of amplifier portions 12 can be fitted to the DIN rail and adjacent to each other. At that time, the electrical connection between neighboring amplifier portions 12 can be provided by a connector 123 provided to a side surface of the amplifier portion 12.

A digital display 124 using a 7-segments LED of 8 figures (4 figures×2), and an output indicator (light emitting diode) 125 to display the measured result (compared result with the reference distance), are provided to an upper surface of the amplifier portion 12. Also, a plurality of push button switches 126 to 128 used to set a reference distance value, switch an operation mode and a display mode, and the like are provided. A protection cover 130 made of a transparent resin to protect the push button switches 126 to 128, the digital display 124, and the like is provided. In FIG. 3, the protection cover 130 is shown in its opened state. The protection cover 130 is pivoted by the hinge portion provided to the upper portion on the rear end side of the amplifier portion 12. When the protection cover 130 is in its closed state, an upper panel (display/operation panel) of the amplifier portion 12 including the push button switches 126 to 128, the digital display 124, and the like is covered with the protection cover 130.

A projecting portion and a receiving portion are built in the head portion 11. The head portion 11 is constructed such that a light LB emitted from the light emitting device is projected to a work WK from a front surface of the head portion 11 and then a reflected light LB' from the work WK is incident on the light receiving device from a front surface of the receiving portion. As already described with reference to FIG. 1, a projection lens is contained in the projecting portion and a reception lens is contained in the receiving portion. Also, a trimmer 112 used to set manually the reference distance by using a light receiving portion adjusting mechanism 27, described later, is provided to a back surface of the head portion 11.

Figure 4:
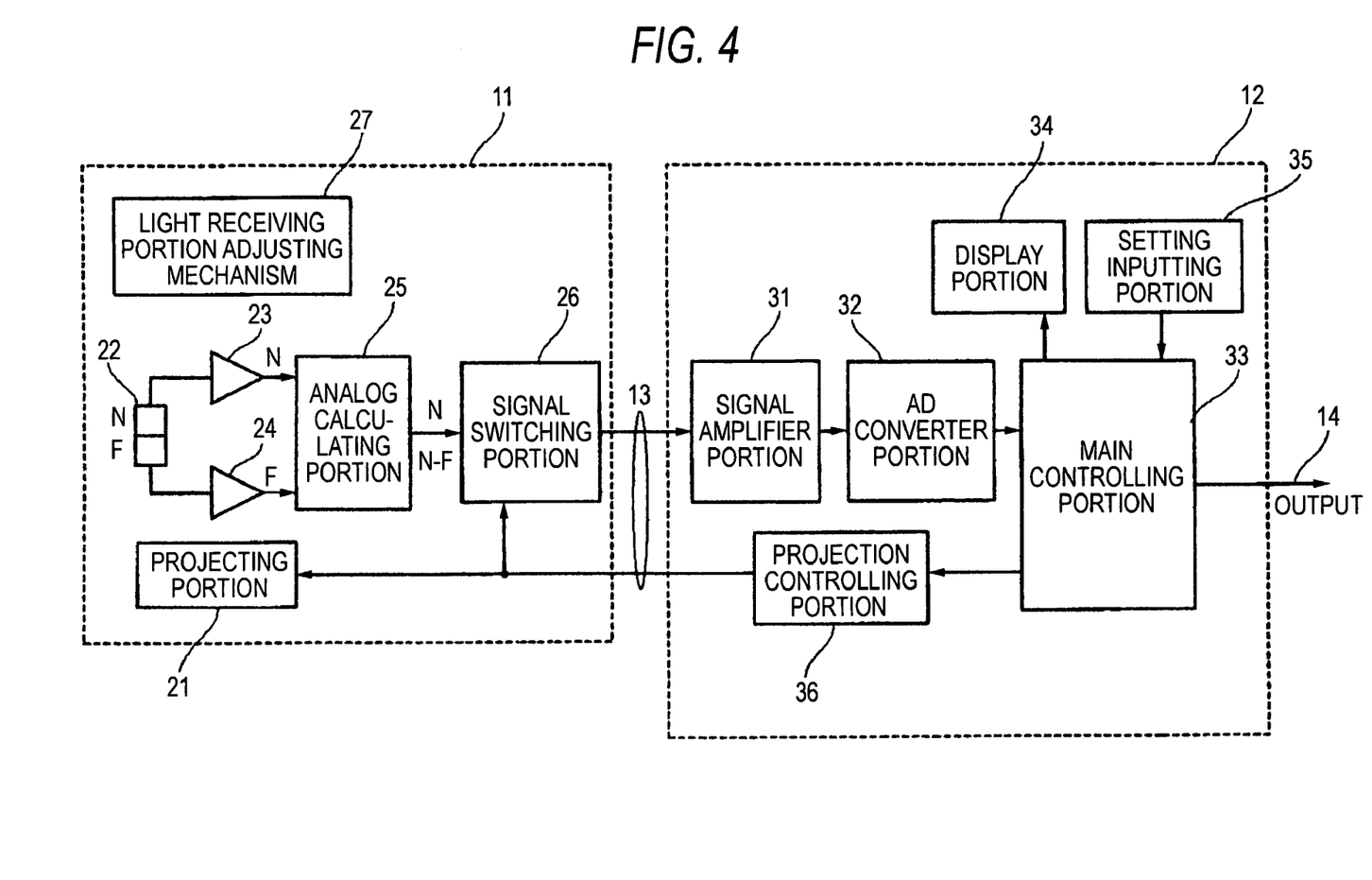
FIG. 4 is a block diagram showing a circuit configuration of the position sensitive photoelectric sensor according to the exemplary, non-limiting embodiment of the present invention.

FIG. 4 is a block diagram showing a circuit configuration of the position sensitive photoelectric sensor according to the embodiment of the present invention. The light emitting device using a laser diode or a light emitting diode and its driver circuit are contained in a projecting portion 21 that is built in the head portion 11. Also, the receiving portion contains a light receiving device 22 using the split PD. As already described with reference to FIG. 2, the photosensitive surface of this split PD is divided into the N-side photosensitive surface and the F-side photosensitive surface, and individual received light quantity signals are output from respective split photosensitive surfaces. In FIG. 2, the received light quantity signal output from the N-side photosensitive surface is indicated by N, and the received light quantity signal output from the F-side photosensitive surface is indicated by F. In some cases, a quantity of received light (voltage or digital converted value) obtained from the N-side photosensitive surface is also represented by N, and a quantity of received light obtained from the F-side photosensitive surface is also represented by F.

As shown in FIG. 4, the received light quantity signals N and F output from the N-side photosensitive surface and the F-side photosensitive surface are input into an analog calculating portion 25 via amplifiers 23 and 24 respectively. Then, the received light quantity signal N and a difference N–F between two received light quantity signals (referred to as a "received light quantity difference signal" hereinafter) are output from the analog calculating portion 25. These signals are input into a signal switching portion 26. The signal switching portion 26 sends out the received light quantity signal N and the received light quantity difference signal N–F alternately (in time division) to the electric cables 13 in accordance with a switch control signal that is output from the amplifier portion 12. The switch control signal given to the signal switching portion 26 is superposed on a control signal of the projecting portion 21, and then sent out from the amplifier portion 12 via the electric cables 13. Here, a light receiving portion adjusting mechanism 27 built in the head portion 11 will be described later.

In the amplifier portion 12, the received light quantity signal N and the received light quantity difference signal N–F fed from the head portion 11 via the electric cables 13 are amplified by a signal amplifier portion 31, then converted into digital values by an AD converter portion 32, and then input into a main controlling portion 33. The main controlling portion 33 restores the other quantity of received light F from the received light quantity signal N and the received light quantity difference signal N–F, both have been converted into digital values. For convenience sake, both the received light quantity difference signal and a difference in quantities of received lights as the corresponding digital value are also represented by N–F. The main controlling portion 33 also executes a normalized calculating process of the difference in quantities of received lights, described later, and causes a display portion 34 to display a resultant digital amount. The display portion 34 includes the digital display 124 and the output indicator 125 provided to the upper panel of the amplifier portion 12 shown in FIG. 3.

Also, a setting inputting portion 35 and a projection controlling portion 36 used to perform the setting of the reference distance (change adjustment), and the like are provided to the amplifier portion 12. The setting inputting portion 35 contains the push button switches 126 to 128 provided to the upper panel of the amplifier 12 shown in FIG. 3. The projection controlling portion 36 provides a projection control signal to the projecting portion 21 of the head portion 11 based on the instruction from the main controlling portion 33. Also, as described above, the projection controlling portion 36 has a function of superposing the switch control signal, which is supplied from the head portion 11 to the amplifier 12 to switch the received light quantity signal N and the received light quantity difference signal N–F in time division, on the projection control signal. The compared result between the distance to the work WK, which is measured when the main controlling portion 33 is in its measuring mode, and the reference distance is displayed on the output indicator 125 contained in the display portion 34 and also is output to the electric cable 14 connected to the control equipment (PLC, or the like).

Figure 5:
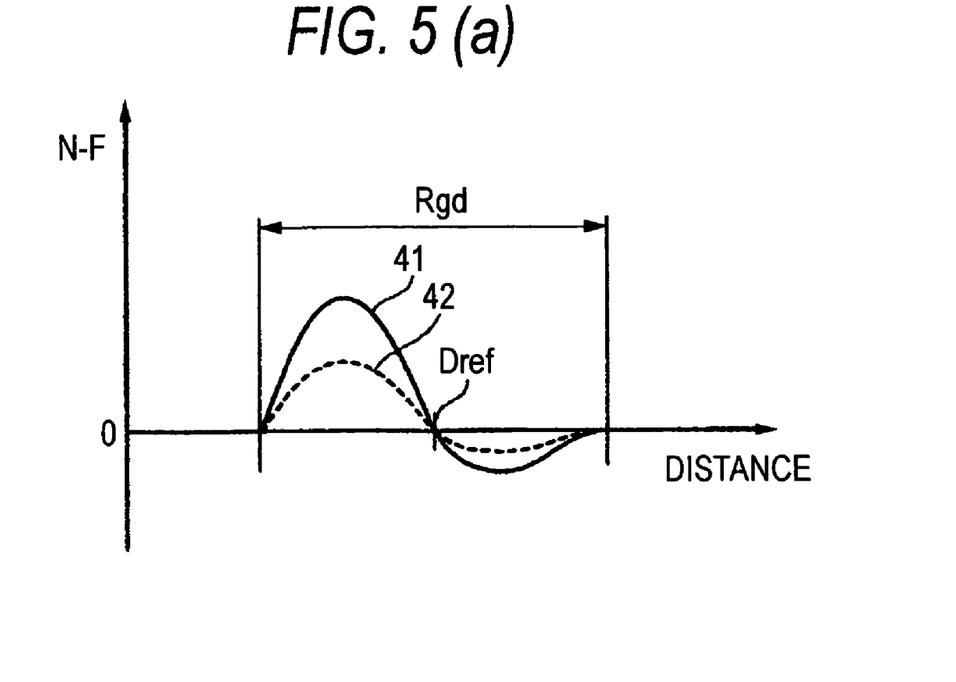
FIGS. 5(a) to 5(b) are graphs explaining a normalized calculation of a difference in a quantity of received light.
Figure 6:
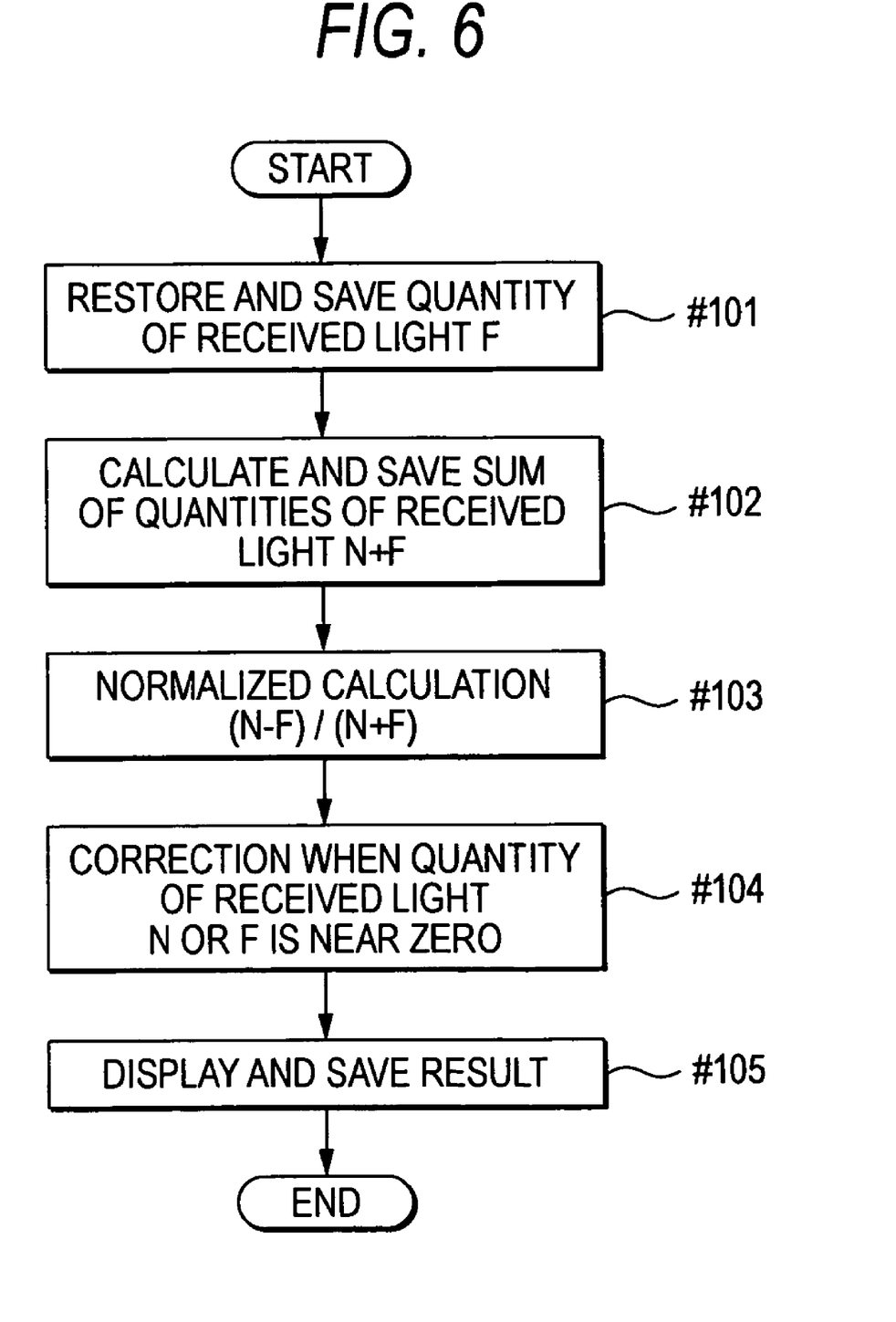
FIG. 6 is a flowchart showing a flow of a normalized calculating process of the difference in a quantity of received light.

FIG. 5 is a graph explaining a normalized calculation of a difference in a quantity of received light. Also, FIG. 6 is a flowchart showing a flow of a normalized calculating process of the difference in a quantity of received light. As described in the explanation of the related art with reference to FIG. 2, when the received light spot SP is positioned on the boundary between the N-side photosensitive surface and the F-side photosensitive surface of the split PD, equal received light quantity signals are obtained from both split photosensitive surfaces and thus the received light quantity difference signal N−F becomes zero. When the received light spot SP is deviated to the N-side photosensitive surface, the signal N−F is a positive value. When the received light spot SP is deviated to the F-side photosensitive surface, the signal N−F is a negative value. This state when depicted in a graph is given by curves indicated with a solid line or a broken line shown in FIG. 5(a).

In FIG. 5(a), a solid-line curve 41 shows the characteristic when the work WK the surface of which has a relatively high light diffuse reflectance is employed, and a broken-line curve 42 shows the characteristic when the work WK the surface of which has a relatively low light diffuse reflectance is employed. In both cases, the received light quantity difference N−F is zero at the reference distance Dref decided based on an arrangement of the optical system. That is, the received light spots SP are distributed equally on the N-side photosensitive surface and the F-side photosensitive surface with respect to the boundary between the N-side photosensitive surface and the F-side photosensitive surface of the split PD as the light receiving device 22. In this case, even though the light spot SP is deviated by the same distance, a value of the received light quantity difference N−F is different dependent upon the light diffuse reflectance of the surface of the work WK at the point where the light spot SP is deviated from the reference distance Dref.

As can be seen from FIG. 5(a), an absolute value of the received light quantity difference N−F is increased and then turned to the decrease as the light spot SP is deviated more largely from the reference distance Dref. Then, this absolute value becomes zero at both ends of a distance range Rgd equivalent to the range in which the light spot SP lies within the photosensitive surface of the light receiving device 22. That is, since both quantities of received lights N and F go to zero when the light spot SP is out of both ends of the photosensitive surface, the value of the received light quantity difference N−F goes of course to zero. It is understood from these facts that the received light quantity difference N−F cannot be used as a sense parameter indicating a relative distance (displacement) as it is.

Therefore, in the position sensitive photoelectric sensor of the present embodiment, the main controlling portion 33 executes a normalized calculating process of the received light quantity difference. This process is applied basically to remove an influence of the light diffuse reflectance of the surface of the work WK by dividing the received light quantity difference N−F by a sum (N+F) of the quantity of received light N and the quantity of received light F. In addition, a process of set forcedly a value (N−F)/(N+F) to 1 when the quantity of received light N or the quantity of received light F comes close to zero is added. Explanation of these processes will be given hereunder along a flowchart in FIG. 6.

FIG. 6 shows respective steps along which the main controlling portion 33 in the amplifier portion shown in FIG. 4 executes the normalized calculating process based on the input received light quantity N and the input received light quantity difference N−F. First, in step #101, the main controlling portion calculates (restores) the quantity of received light F by subtracting the received light quantity difference N−F from the received light quantity N. In some cases, this quantity of received light F together with the received light quantity N is displayed individually on the digital display 124, as explained later. Therefore, a resultant quantity of received light F as well as the received light quantity N is saved in a memory in the main controlling portion 33.

Then, in step #102, the main controlling portion calculates a sum (received light quantity sum) N+F of the quantity of received light N and the quantity of received light F. This value is also saved in the memory because sometimes such value is displayed on the digital display 124. In next step #103, the main controlling portion executes the normalizing calculation to detect (N−F)/(N+F) by dividing the received light quantity difference N−F by the received light quantity sum N+F.

Then, in next step #104, the main controlling portion executes a correcting process applied when the quantity of received light N or F is in vicinity of zero. This process sets forcedly a value (N−F)/(N+F) to 1 when the quantity of received light N or F is reduced smaller than a predetermined value that is close to zero. This process is carried out to avoid such a situation that the value (N−F)/(N+F) becomes unstable when the quantity of received light N or F comes close to zero and thus a relationship between the value (N−F)/(N+F) and the distance cannot be defined uniquely. Then, in step #105, the value (N−F)/(N+F) obtained in this manner is save in the memory in the main controlling portion 33 and also is digitally displayed on the digital display 124 as the numerical value indicating the relative distance (displacement).

The value (N−F)/(N+F) obtained as above as the result of the normalized calculating process when depicted in a graph is shown in FIG. 5(b). In FIG. 5(b), a value D(N−F)/(N+F) obtained by multiplying the value (N−F)/(N+F) in the distance range Rgd by a predetermined coefficient D is depicted by a curve 43. As can be seen from FIG. 5(b), the value D(N−F)/(N+F) is changed substantially linearly in a range Rg1 being set by removing both end portions from the distance range Rgd. Both end portions correspond to the range in which the value (N−F)/(N+F) is set forcedly to 1. Since a relationship between the value D(N−F)/(N+F) and the distance is substantially linear within the range Rg1 except both end portions, the reference distance can be set arbitrarily in this range.

In other words, unlike the related art, there is no need to fix the distance Dref, at which the received light quantity difference N−F decided based on the arrangement of the optical system becomes zero, as the reference distance. The reference distance can be set (changed) within a predetermined range (the range Rg1 in FIG. 5(b)) containing this distance. The main controlling portion 33 can execute this change setting of the reference distance as the digital value by software. Therefore, the reference distance can be set automatically like the conventional teaching.

Figure 7:
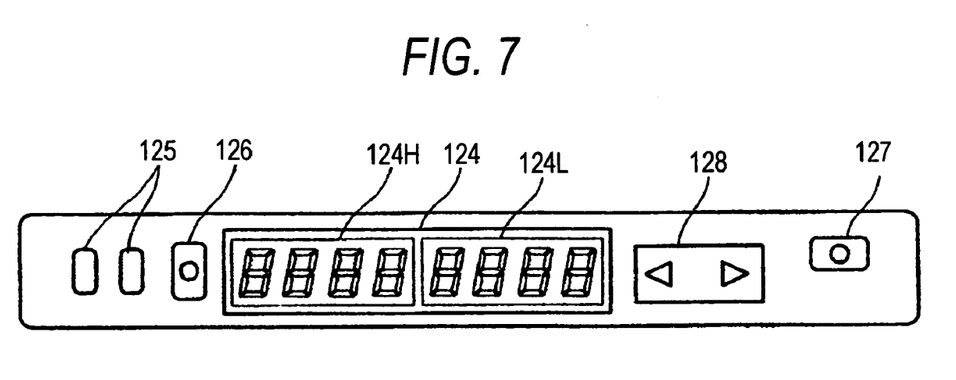
FIG. 7 is a plan view of an upper panel containing push button switches and a digital display of an amplifier portion.
Figure 8:
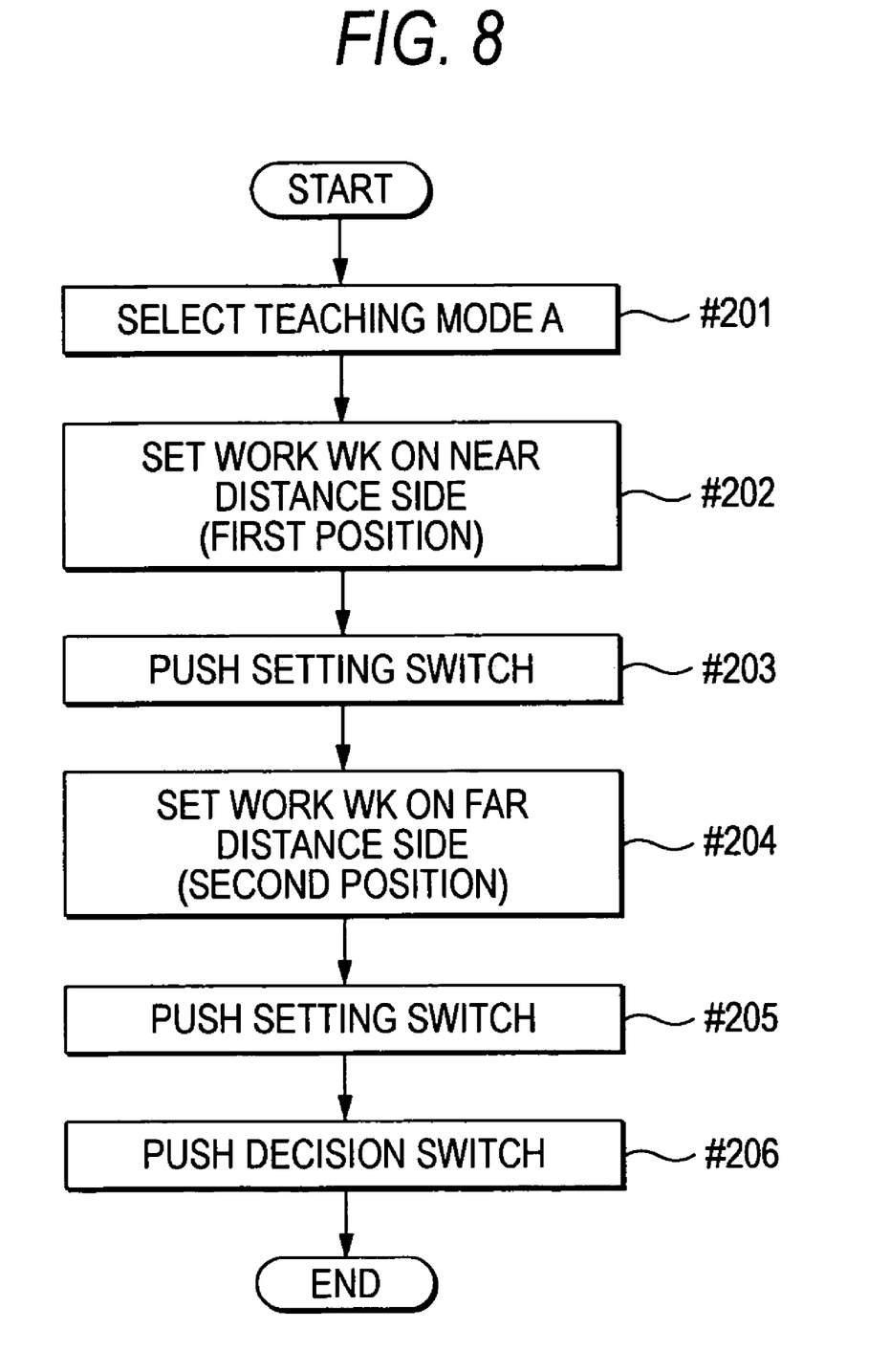
FIG. 8 is a flowchart showing an example of teaching.

An example of the automatic setting of the reference distance by the teaching will be explained with reference to FIG. 7 and FIG. 8 hereunder. FIG. 7 is a plan view of the upper panel containing the push button switches 126 to 128 and the digital display 124 of the amplifier portion 12. FIG. 8 is a flowchart showing an example of teaching. The display and the operation of the upper panel shown in FIG. 7 will be explained simply prior to explanation of an example of the teaching.

In FIG. 7, as already explained above, the output indicator 125 is the LED on which the compared result between the distance to the work WK when the main controlling portion 33 measured in its measuring mode and the reference distance is displayed. For example, the output indicator 125 on the left side is turned ON when the distance to the work WK is shorter than the reference distance, but the output indicator 125 on the right side is turned ON when the distance to the work WK is longer than the reference distance. In this case, in order to avoid a chattering, or the like of the display on the output indicator 125, a predetermined hysteresis (dead zone) is provided to the compared result between the distance to the work WK and the reference distance. That is, switching timings of the output indicator 125, and the like are different by a distance of hysteresis when the work WK comes close to the head portion 11 and when the work WK goes away from the head portion 11.

The digital display 124 is the 7-segments LED of 8 figures, and is separated into a display portion 124H of upper 4 figures and a display portion 124L of lower 4 figures. A wide variety of displays can be realized in the setting mode and the measuring mode by using the display portion 124H and the display portion 124L. For example, in the measuring mode, the numerical value equivalent to the reference distance is displayed on the display portion 124H and also the numerical value equivalent to a present value of the distance to the work WK (the value D(N−F)/(N+F) after the normalized calculating process) is displayed on the display portion 124L. Alternately, the received light quantity difference N−F and the received light quantity sum N+F are displayed on the display portion 124H and the display portion 124L respectively. These plural display modes may be switched by the push button switch 126 or 127. The digital display 124 can display simply not only the above numerical values but also error codes, symbols of operation modes, and the like.

The push button switch 126 or 127 is used to switch the display modes, the operation modes (setting mode, measuring mode, and the like), and others. Also, the push button switch 128 is an up-down key (increase/decrease key), and is used in the manual fine adjustment of the reference distance being set previously.

A flowchart in FIG. 8 shows an example of the teaching as flow of the operation made by the user. In step #201, the user selects a teaching mode A from plural types of teaching modes prepared previously. This selection is executed by pushing the push button switch 126 or 127, or their combination.

Then, in step #202, the user sets the work WK in a first position in front of the head portion 11. This first position is a position on the near distance side, in which the presence of the work WK is to be sensed. At this time, the main controlling portion 33 calculates the numerical value corresponding to a present value of the distance to the work WK, and then causes the right-side display portion 124H, for example, of the digital display 124 to display the value. Then, in step #203, the user pushes the setting switch (push button switch 126 or 127) in this condition. As a result, the numerical value displayed on the digital display 124 and corresponding to the position on the near distance side is fixed.

Then, in step #204, the user sets the work WK in a second position in front of the head portion 11. This second position is a position on the far distance side, in which the presence of the work WK is not to be sensed. At this time, the main controlling portion 33 calculates the numerical value corresponding to the present value of the distance to the work WK, and then causes the right-side display portion 124L, for example, of the digital display 124 to display the value. Then, in step #205, the user pushes the setting switch in this condition. As a result, the numerical value displayed on the digital display 124 and corresponding to the position on the far distance side is fixed. Finally, the user checks the numerical values displayed on the digital display 124 indicating the first position and the second position, and then pushes the decision switch (the push button switch 126 or 127) (step #206). Thus, the operation in the teaching mode is ended. The main controlling portion 33 calculates a middle value, for example, between the numerical values in the first position and the second position and sets this middle value as the reference distance. This set reference distance is displayed on the right-side display portion 124H, for example, of the digital display 124.

As described above, the range in which the main controlling portion 33 can set the reference distance by software, i.e., the range in which the user can set the first position and the second position by the operation in the teaching mode A corresponds to the range Rg1 in FIG. 5(b). This range is decided by the arrangement of the optical system and a size of the photosensitive surface of the light receiving device and is restricted in a relatively narrow range. Therefore, the position sensitive photoelectric sensor of the present embodiment is equipped with a light receiving portion adjusting mechanism (27 in FIG. 4) that changes the reference distance Dref in FIGS. 5(a) and (b) by changing an angle of the receiving portion.

Figure 9:
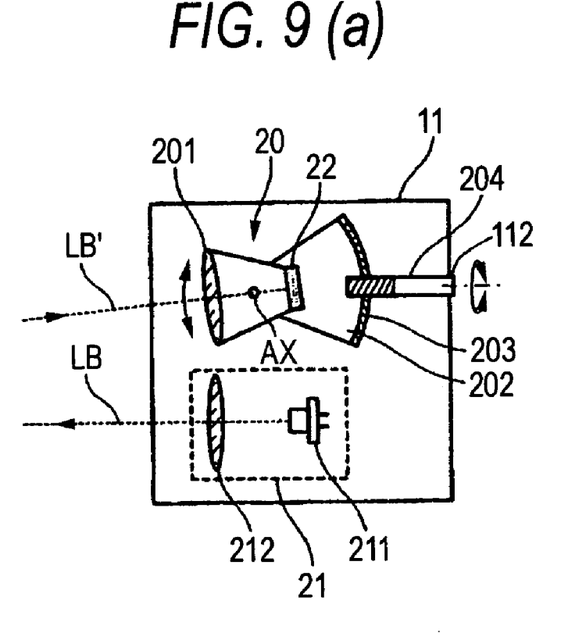
FIGS. 9(a) to 9(b) are views showing schematically a configurative example of a light receiving portion adjusting mechanism.

FIG. 9 is a view showing schematically a configurative example of the light receiving portion adjusting mechanism 27. FIG. 9(a) shows the case where the manual adjustment is employed, and FIG. 9(b) shows the case where the motor-driven adjustment is employed. The projecting portion 21 and a light receiving portion 20 are built in the head portion 11, the projecting portion 21 contains a light emitting device 211 and a projection lens 212. The light receiving portion 20 contains the light receiving device 22 and a reception lens 201. In this example, a position and an angle of the projecting portion 21 are fixed, and the light receiving device 22 and the reception lens 201 in the light receiving portion 20 can be turned integrally around an axis AX. A sectorial member 202 is fixed to the light receiving portion 20, and a helical gear 203 is formed on its peripheral portion along a circular arc around the axis AX. Also, a rotary operating rod 204 on which gear grooves that engage with the helical gear 203 are formed is provided, and its end portion is exposed from the back surface of the head portion 11 as a trimmer 112 that is shown in FIG. 3 and operated to turn.

According to the above structure, the light receiving portion 20 is turned around the axis AX when the user operates to turn the trimmer 112 (rotary operating rod 204). As a result, an angle of the optical axis is changed when the reflected light LB' from the work WK is incident on the center of the light receiving device 22, and thus the reference distance Dref decided based on the arrangement of the optical system can be changed.

In a configuration shown in FIG. 9(b), an electric motor (a stepping motor, a geared motor, or the like) 205 is provided in place of the trimmer 112 (rotary operating rod 204), and a gear 206 that is engaged with the helical gear 203 of the sectorial member 202 is fixed to the rotating shaft. When the electric motor 205 is rotated/driven by the control signal from the main controlling portion 33 in the amplifier portion 12, the light receiving portion 20 is turned around the axis AX, like the manual operation in FIG. 9(a), and thus the reference distance Dref decided based on the arrangement of the optical system can be changed. If a rotating angle of the light receiving portion 20 around the axis AX is sensed by a rotary encoder, or the like, the automatic adjustment of the reference distance Dref by the main controlling portion 33 can be accomplished. In the case of the setting by the manual operation in FIG. 9(a), it is preferable that the user can confirm visually a criterion of the reference distance Dref based on a rotating angle of the trimmer 112, or the like.

In the example of the light receiving portion adjusting mechanism 27 shown in FIG. 9, the reference distance Dref is changed by turning/operating the light receiving device 22 and the reception lens 201 integrally. But the reference distance Dref can be changed by parallel-moving the light receiving device 22 and the reception lens 201 integrally. In other words, if the light receiving portion 20 is parallel-moved in the direction to come close to or go away from the projecting portion 21 (vertical direction in FIG. 9), the position of the light spot on the photosensitive surface of the light receiving device 22 is changed and then the reference distance Dref can be changed. Alternately, the reference distance Dref can be changed similarly by moving solely the light receiving device 22 or the reception lens 201 in the vertical direction.

In addition, it is apparent from the foregoing description that, when an angle or a position of the projecting portion 21 instead of the light receiving portion 20 is changed, the position of the light spot on the photosensitive surface of the light receiving device 22 is changed and then the reference distance Dref can be changed. More particularly, in order to change the reference distance Dref by changing the light spot position or the center-of-gravity position of the light quantity distribution on the photosensitive surface of the light receiving device 22, an optical adjusting mechanism for adjusting an angle or a position of at least one of the light emitting device 211, the projection lens 212 and the reception lens 201 may be provided. The light receiving portion adjusting mechanism 27 shown in FIG. 9 is merely an example of this optical adjusting mechanism. For example, when the optical adjusting mechanism is constructed such that respective angles of the light receiving portion 20 and the projecting portion 21 are changed simultaneously in the opposite direction mutually, such structure is preferable to sense the work WK having the surface (mirror surface) that reflects a light regularly.

The position sensitive photoelectric sensor according to the present embodiment provides a setting function that is convenient for the user, by using together the setting of the reference distance Dref made by the optical adjusting mechanism (the light receiving portion adjusting mechanism 27) and the setting of the reference distance (the change adjustment or the fine adjustment), which the main controlling portion 33 performs by software, within a predetermined range.

Figure 10:
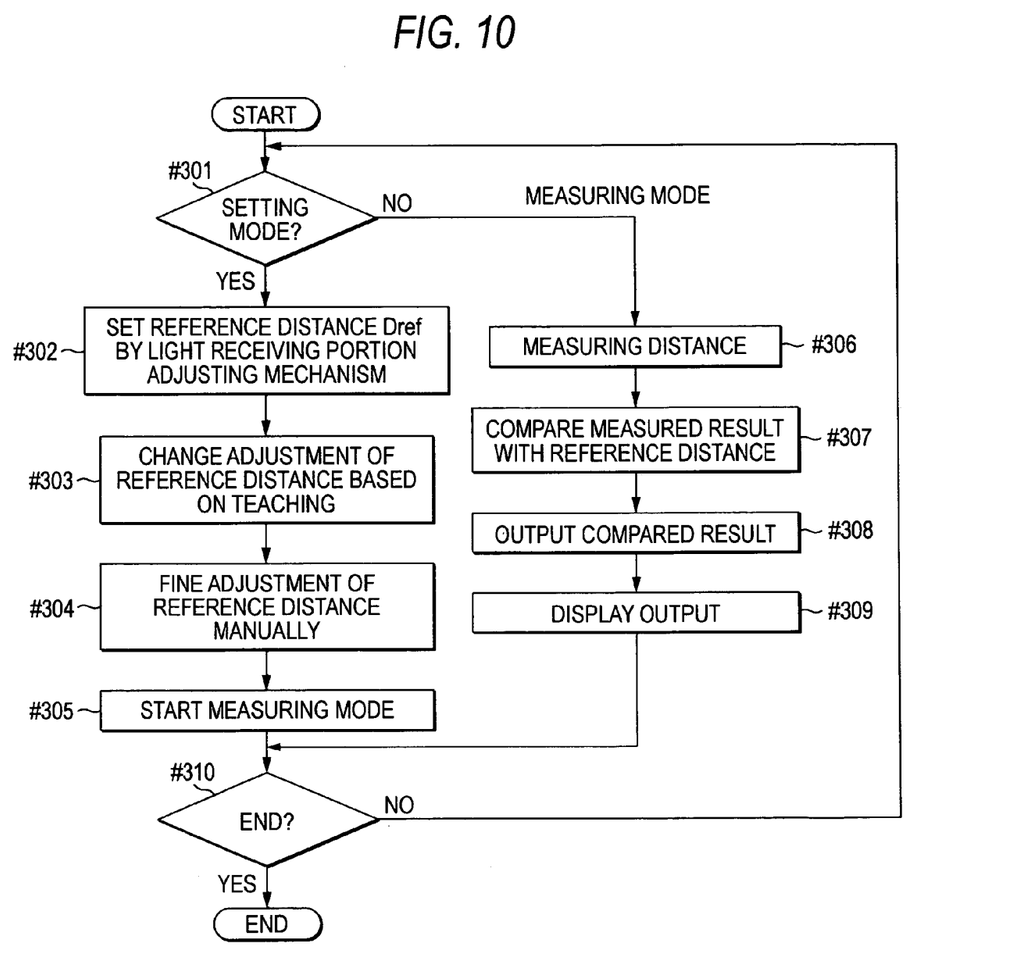
FIG. 10 is a flowchart showing an outline of a setting mode and a measuring mode in the position sensitive photoelectric sensor according to the present embodiment.

FIG. 10 is a flowchart showing an outline of the setting mode and the measuring mode in the position sensitive photoelectric sensor according to the present embodiment. In step #301, it is decided whether or not an operation mode is the setting mode or the measuring mode. When the operation mode is the setting mode, the reference distance Dref is set in next step #302 by the light receiving portion adjusting mechanism 27. As this setting, either the manual setting using the mechanism shown in FIG. 9(a) or the motor-driven (or automatic) setting using the mechanism shown in FIG. 9(b) may be employed.

In step #303, the change adjustment of the reference distance is performed based on the teaching after the reference distance Dref is set. An example of this teaching has already been explained. Then, in step #304, the fine adjustment of the reference distance is carried out manually. That is, the user can adjust to increase/decrease the set value of the reference distance by using the push button switch 128 as the up-down key that is provided to the upper panel of the amplifier portion 12. At this time, the set reference distance is displayed on (the right-side display portion 124H of) the digital display 124 and the display value is increased/decreased following upon the operation of the push button switch 128. Then, the setting value of the reference distance is defined, and then the measuring mode is started (step #305).

Also, the setting may be applied by omitting either of step #303 and step #304. For example, after the reference distance Dref is set by the light receiving portion adjusting mechanism 27 in step #302, the manual fine adjustment of the reference distance by using the push button switch 128 may be performed directly in step #304 by omitting the change adjustment of the reference distance by the teaching in step #303. Otherwise, after the change adjustment of the reference distance by the teaching is performed in step #303, the operation mode may be changed from the setting mode to the measuring mode by omitting the manual fine adjustment of the reference distance in step #304. Both the processes in step #303 and step #304 are the change adjustment (or the fine adjustment) of the reference distance that the main controlling portion 33 performs by software.

When the operation mode is decided as the measuring mode in step #301, the distance to the work WK is measured in step #306. This measurement is carried out within the range Rg1 in which the value D(N−F)/(N+F) obtained after the normalized calculation of the received light quantity difference is changed substantially linearly in response to the distance, as shown in FIG. 5. Then, in step #307, the measured result is compared with the reference distance to decide whether the distance to the work Wk is closer or further than the reference distance. As described above, the compared result is output to the electric cable 14 connected to the control equipment (PLC, or the like) (step #308), and is displayed on the output indicator 125 contained in the display portion 34 (step #309). Subsequently, the above processes are repeated until the operation is end (Yes in step #310).

In the present embodiment, the teaching is executed in the setting mode. As another embodiment, the teaching may be executed in the measuring mode and the change/setting of the reference distance Dref may be carried out during the measurement.

With the above, the embodiment and variation of the present invention are explained. But the present invention is not limited to the above embodiment and variation, and can be accomplished in various modes. For example, the present invention is not limited to the amplifier-separated photoelectric switch in which the head portion 11 and the amplifier portion 12 are connected via the electric cables 13, as shown in FIG. 3. But the present invention may be applied to the amplifier-integrated photoelectric switch in which the head portion and the amplifier portion are built in one casing.

Also, in the present embodiment, the structure using the sectorial member 202 and the helical gear 203 is shown as the example of the optical adjusting mechanism (light receiving portion adjusting mechanism 27). In addition, various publicly-known structures such as the rack and pinion mechanism, the screw feed mechanism, and the like can be employed.

Figure 11:
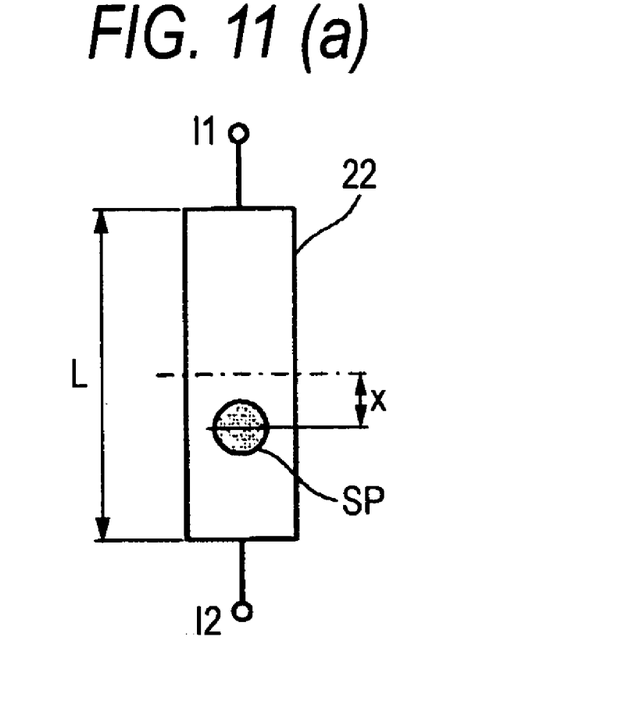
FIGS. 11(a) to 11(b) are views explaining an operational principle in the case where PSD or CCD is employed as the light receiving device as another embodiment.

Also, in the present embodiment, the inexpensive split PD is used as the light receiving device 22. But PSD (position sensitive semiconductor device) or CCD (solid-state image sensor), which is employed normally in the related art, may be employed as the light receiving device 22. In the PSD, as shown in FIG. 11(a), a pair of signal output terminals are provided to both ends of the high-resistance semiconductor substrate constituting the photosensitive surface in the longitudinal direction. Photocurrents I1 and I2 are picked up from a pair of signal output terminals by the photo-electromotive force when the light hits the photosensitive surface. Values of the photocurrents I1 and I2 are changed according to the position of the light spot on the photosensitive surface. Suppose that L is a length of the photosensitive surface and x is a distance from a center of the photosensitive surface to a center of gravity of the light spot SP, as shown in FIG. 11(a), a relation (I2−I1)/(I1−I2)=2x/L is satisfied. Therefore, if the values of the photocurrents I1 and I2 can be known, a position X of the light spot SP in the longitudinal direction can be calculated.

Also, in the CCD, as shown in FIG. 11(b), signals each equivalent to a quantity of received light can be obtained from respective pixels that are aligned in the longitudinal direction. Therefore, a received light quantity distribution signal 51 can be derived from the received light quantity signals generated from respective pixels, and then a center of gravity of the light spot SP can be calculated by processing this distribution signal. In this case, FIG. 11(b) shows the example of the one-dimensional CCD (linear image sensor), but a two-dimensional CCD (area image sensor) may be employed.

As described above, in the case where the PSD or the CCD is employed as the light receiving device 22, when the rough reference distance is set by the optical adjusting mechanism (light receiving portion adjusting mechanism) and then the change adjustment (fine adjustment) of the reference distance is performed by software, like the above embodiment, the setting and the change of the reference distance can be executed easily and appropriately while covering the wide measured distance range.

Also, the above embodiment is constructed such that the received light quantity signal N and the received light quantity difference signal N–F are supplied alternately (in time division) from the head portion 11 to the amplifier portion 12 via the electric cables 13. Another embodiment may be constructed such that received light quantity signal F is supplied instead of the received light quantity signal N. That is, the received light quantity signal F and the received light quantity difference signal N–F are supplied alternately to the amplifier portion 12 via the electric cables 13. Normally the received light quantity signal F (far-side received light quantity signal) possesses the advantage such that a peak level is lower than the received light quantity signal N (near-side received light quantity signal) and also saturation is hard to take place.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

We claim:

1. A position sensitive photoelectric sensor comprising:
a light emitting device for emitting a light;
a projection lens for projecting the light emitted from the light emitting device onto a target;
a reception lens;
a light receiving device for receiving a reflected light from the target through the reception lens;
a main controlling portion for calculating a distance to the target by processing a signal from the light receiving device to calculate a position of a received light spot on a photosensitive surface or a center-of-gravity position of a received light quantity distribution; and
an optical adjusting mechanism for changing the position of the received light spot on the photosensitive surface of the light receiving device or the center-of-gravity position of the received light quantity distribution, by adjusting an angle or a position of at least one of the light emitting device, the projection lens, the reception lens, and the light receiving device,
wherein the main controlling portion has a function of outputting a binary signal as a compared result between the calculated distance to the target and a reference distance, and a change adjustment of the reference distance is performed in a situation that an adjustment is made by the optical adjusting mechanism, wherein the change adjustment of the reference distance includes setting the reference distance by the optical adjusting mechanism, and further comprises a change adjustment of the reference distance performed by teaching and executed by the main controlling portion by software, and a fine adjustment of the reference distance made by a manual operation of an increase/decrease switch.

2. A position sensitive photoelectric sensor, according to claim 1, wherein a split photo diode whose photosensitive surface is divided into a first photosensitive surface and a second photosensitive surface to output an individual received light quantity signal from each split photosensitive surface is employed as the light receiving device, and
the main controlling portion executes a normalized calculation, in which a difference between a first quantity of received light obtained from the first photosensitive surface and a second quantity of received light obtained from the second photosensitive surface is divided by a sum of both quantities of received light, to get a sensing parameter that changes substantially linearly within a predetermined range in response to the distance, and then performs the change adjustment of the reference distance within the predetermined range.

3. A position sensitive photoelectric sensor, according to claim 1, wherein the main controlling portion performs the function of performing the change adjustment of the reference distance by calculating the reference distance as the teaching using first and second position distances, the first position distance being a distance to a first position calculated by the position sensitive photoelectric sensor, the second position distance being a distance to a second position, which is farther than the first portion, calculated by the position sensitive photoelectric sensor.

4. A position sensitive photoelectric sensor, according to claim 1, further comprising:
a display portion for displaying the calculated distance to the target or the reference distance.

5. A position sensitive photoelectric sensor, according to claim 4, wherein the display portion includes first and second display sections, the first display section displaying the calculated distance to the target, the second display section displaying the reference distance.

6. A position sensitive photoelectric sensor, according to claim 4, wherein the display portion includes first and second display sections, the first display section displaying a distance to a first position, the second display section displaying a distance to a second position.

7. A position sensitive photoelectric sensor, according to claim 1, further comprising:
an indicator for displaying the compared result, the indicator including first and second indicators, the first indicator being turned ON when the calculated distance to the target is shorter than the reference distance, the second indicator being turned ON when the calculated distance to the target is longer than the reference distance.

8. A position sensitive photoelectric sensor, according to claim 1, wherein the main controlling portion adjusts the optical adjustment mechanism by an electrical instruction.

9. A method of setting a reference distance in a position sensitive photoelectric sensor that includes a light emitting device and a projection lens for projecting a light onto a target, and a reception lens and a light receiving device for receiving a reflected light from the target, calculates a distance to a target based on a triangular range finding using a light, and outputs a binary signal as a compared result between the calculated distance and a reference distance, the method comprising:
    a first step of changing a position of a received light spot on a photosensitive surface of the light receiving device or a center-of-gravity position of a received light quantity distribution by an optical adjusting mechanism that adjusts an angle or a position of at least one of the light emitting device, the projection lens, the reception lens, and the light receiving device; and
    a second step of performing a change adjustment of the reference distance, wherein the second step comprises setting the reference distance by the optical adjusting mechanism, and further comprises a change adjustment of the reference distance performed by teaching and executed by a main controlling portion by software, and a fine adjustment of the reference distance made by a manual operation of an increase/decrease switch.

10. A method of setting a reference distance in a position sensitive photoelectric sensor, according to claim 9, wherein the second step includes performing the change adjustment of the reference distance by calculating the reference distance as the teaching using first and second position distances, the first position distance being a first distance to a first position calculated by the position sensitive photoelectric sensor, the second position distance being a second distance to a second position, which is farther than the first portion, calculated by the position sensitive photoelectric sensor.

11. A method of setting a reference distance in a position sensitive photoelectric sensor, according to claim 10, further comprising:
    a third step of displaying the first distance in a first display section of the position sensitive photoelectric sensor and displaying the second distance in a second display section of the position sensitive photoelectric sensor.

12. A method of setting a reference distance in a position sensitive photoelectric sensor, according to claim 11, further comprising:
    a fourth step of displaying the calculated distance to the target or the reference distance.

13. A method of setting a reference distance in a position sensitive photoelectric sensor that includes a light emitting device and a projection lens for projecting a light onto a target, and a reception lens and a light receiving device for receiving a reflected light from the target, calculates a distance to a target by processing a signal from the light receiving device to calculate a position of a received light spot on a photosensitive surface of the light receiving device or a center-of-gravity position of a received light quantity distribution, and outputs a binary signal as a compared result between the calculated distance and a reference distance, the method comprising:
    a first step of changing the position of the received light spot on the photosensitive surface of the light receiving device or the center-of-gravity position of the received light quantity distribution by an optical adjusting mechanism that adjusts an angle or a position of at least one of the light emitting device, the projection lens, the reception lens, and the light receiving device;
    a second step of calculating the reference distance using first and second position distances, the first position distance being a first distance to a first position calculated by the position sensitive photoelectric sensor, the second position distance being a second distance to a second position, which is farther than the first portion, calculated by the position sensitive photoelectric sensor; and
    a third step of changing the reference distance changed by the second step with a user's operation.

14. A method of setting a reference distance in a position sensitive photoelectric sensor, according to claim 13, further comprising:
    a fourth step of displaying the calculated distance to the target or the reference distance.

15. A method of setting a reference distance in a position sensitive photoelectric sensor, according to claim 14, wherein the fourth step includes displaying the calculated distance to the target in a first display section of the position sensitive photoelectric sensor and displaying the reference distance in a second display section of the position sensitive photoelectric sensor.

16. A method of setting a reference distance in a position sensitive photoelectric sensor, according to claim 14, further comprising:
    a fifth step of displaying the first distance in a first display section of the position sensitive photoelectric sensor and displaying the second distance in a second display section of the position sensitive photoelectric sensor.

17. A method of setting a reference distance in a position sensitive photoelectric sensor, according to claim 13, wherein the first step includes adjusting the optical adjustment mechanism by an electrical instruction.

* * * * *